US005563761A

United States Patent [19]

Apa et al.

[11] Patent Number: 5,563,761

[45] Date of Patent: Oct. 8, 1996

[54] TRANSIENT VOLTAGE SURGE PROTECTION ASSEMBLY FOR TELECOMMUNICATIONS LINES

[75] Inventors: Stephen R. Apa, Lemoyne; Walter P. Leufert, Linglestown; Ping Peng, Harrisburg; David L. Rocker, Middletown, all of Pa.

[73] Assignee: The Whitaker Corporation, Wilmington, Del.

[21] Appl. No.: 515,181

[22] Filed: Aug. 11, 1995

[51] Int. Cl.$^6$ .......... H02H 9/04

[52] U.S. Cl. .......... 361/119; 361/111

[58] Field of Search .......... 361/111, 56, 119; 439/620

[56] References Cited

U.S. PATENT DOCUMENTS

| | | | |
|---|---|---|---|
| 4,282,555 | 8/1981 | Svedbery | 361/56 |
| 4,392,701 | 7/1983 | Weidler | 339/17 |
| 4,449,156 | 5/1984 | Singer, Jr. | 361/119 |
| 4,477,857 | 10/1984 | Crocker | 361/119 |
| 4,661,878 | 4/1987 | Brown et al. | 361/56 |
| 4,772,225 | 9/1988 | Ulery | 439/620 |
| 4,789,847 | 12/1988 | Sakamoto et al. | 439/620 |
| 4,862,311 | 8/1989 | Rust et al. | 361/91 |
| 4,894,630 | 1/1990 | Ueta et al. | 333/185 |
| 4,950,169 | 8/1990 | Martin et al. | 439/620 |
| 5,181,864 | 1/1993 | Wakino et al. | 439/620 |
| 5,208,723 | 5/1993 | Jenne | 351/119 |
| 5,357,568 | 10/1994 | Pelegris | 361/119 |
| 5,359,568 | 10/1994 | Livay et al. | 365/221 |
| 5,359,657 | 10/1994 | Pelegris | 379/412 |

*Primary Examiner*—Todd DeBoer

[57] ABSTRACT

An assembly mounted to a grounded chassis and connected between first and second multi-conductor cables carrying a plurality of transmission line-pairs. The assembly provides transient voltage surge protection to the plurality of line-pairs. The protective circuitry is mounted on a printed circuit board along with connectors and is contained within an insulative housing. The connectors of the assembly are mounted to the printed circuit board and are matable with connectors terminating multi-conductor cables so that the protective circuitry is interposed in the line-pairs carried by the cables.

10 Claims, 4 Drawing Sheets

TRANSIENT VOLTAGE SURGE PROTECTION ASSEMBLY FOR TELECOMMUNICATIONS LINES

BACKGROUND OF THE INVENTION

This invention relates to the protection of telecommunications lines from transient voltage surges, such as those due to lightning, and, more particularly, to an assembly for providing such protection to a plurality of transmission line-pairs carried by a multi-conductor cable.

Telecommunications transmission lines are typically susceptible to lightning strikes when not within a building. Accordingly, primary lightning protection is usually provided where the transmission lines enter a building. However, modern telecommunications equipment, such as computer controlled private branch exchanges, are very sensitive to transient surges such as those caused by lightning strikes and the primary lightning protection is often inadequate. Telecommunications equipment manufacturers therefore commonly provide secondary surge protection within their equipment. Such equipment, for example, a computer controlled private branch exchange, may have twenty, fifty or even more, telephone line-pairs connected thereto. Therefore, if the secondary surge protection is incorporated within the equipment, this leads to a number of disadvantages. One disadvantage is that the secondary surge protection takes up valuable "real estate" within the telecommunications equipment. Another disadvantage is that bulky cables carrying thick wire have to be utilized between the primary protection and the secondary protection. It is therefore a primary object of the present invention to provide transient voltage surge protection circuitry for telecommunications equipment which overcomes the aforementioned disadvantages.

SUMMARY OF THE INVENTION

An ideal solution would be to provide the secondary protection within a cable connector close to the primary protection. Since cables typically carry twenty-five line-pairs, such a connector would be bulky and difficult to handle. Therefore, in accordance with the principles of this invention, the secondary protection is contained within an adaptor assembly connected between two multi-conductor cables. The first cable is relatively short and is connected to the primary protection. This short cable can be thick. The second cable is connected to the telecommunications equipment and is relatively thin. Since the telecommunications equipment can be located at a substantial distance from the primary protection, a significant cost saving results from being able to utilize a thinner cable. Thus, according to this invention, there is provided an adaptor assembly mounted to a grounded chassis and connected between first and second multi-conductor cables carrying a plurality of transmission line-pairs. The cables are terminated respectively by first and second cable connectors. The assembly provides transient voltage surge protection to the plurality of line-pairs, wherein the transient voltage surge protection for each of the line-pairs is provided by a three-terminal protective network having its first and second terminals adapted to be coupled to respective wires of each line-pair and its third terminal adapted to be connected to ground. The assembly comprises a circuit board having a ground plane and third and fourth cable connectors mounted to the circuit board in spaced relationship, with the third cable connector being matable with the first cable connector and the fourth cable connector being matable with the second cable connector. The assembly further comprises means for mounting the protective network to the circuit board, and means for coupling the first and second terminals of the protective network to the third and fourth cable connectors so that when the first cable connector is mated with the third cable connector and the second cable connector is mated with the fourth cable connector, the protective network is coupled to each of the line-pairs. In addition, the assembly comprises means for connecting the third terminal of the protective network to the circuit board ground plane, and mounting means for connecting the circuit board ground plane to the chassis.

In accordance with an aspect of this invention, there is a respective protective network associated with each of the line-pairs.

In accordance with another aspect of this invention, the assembly further includes a plurality of resettable fuse elements, each of the fuse elements corresponding to a respective conductor of the first cable and a respective conductor of the second cable. The assembly also includes means for mounting the fuse elements to the circuit board and means for connecting the fuse elements to the third and fourth cable connectors so that each of the fuse elements is in series between respective conductors of the first and second cables connected to the assembly.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
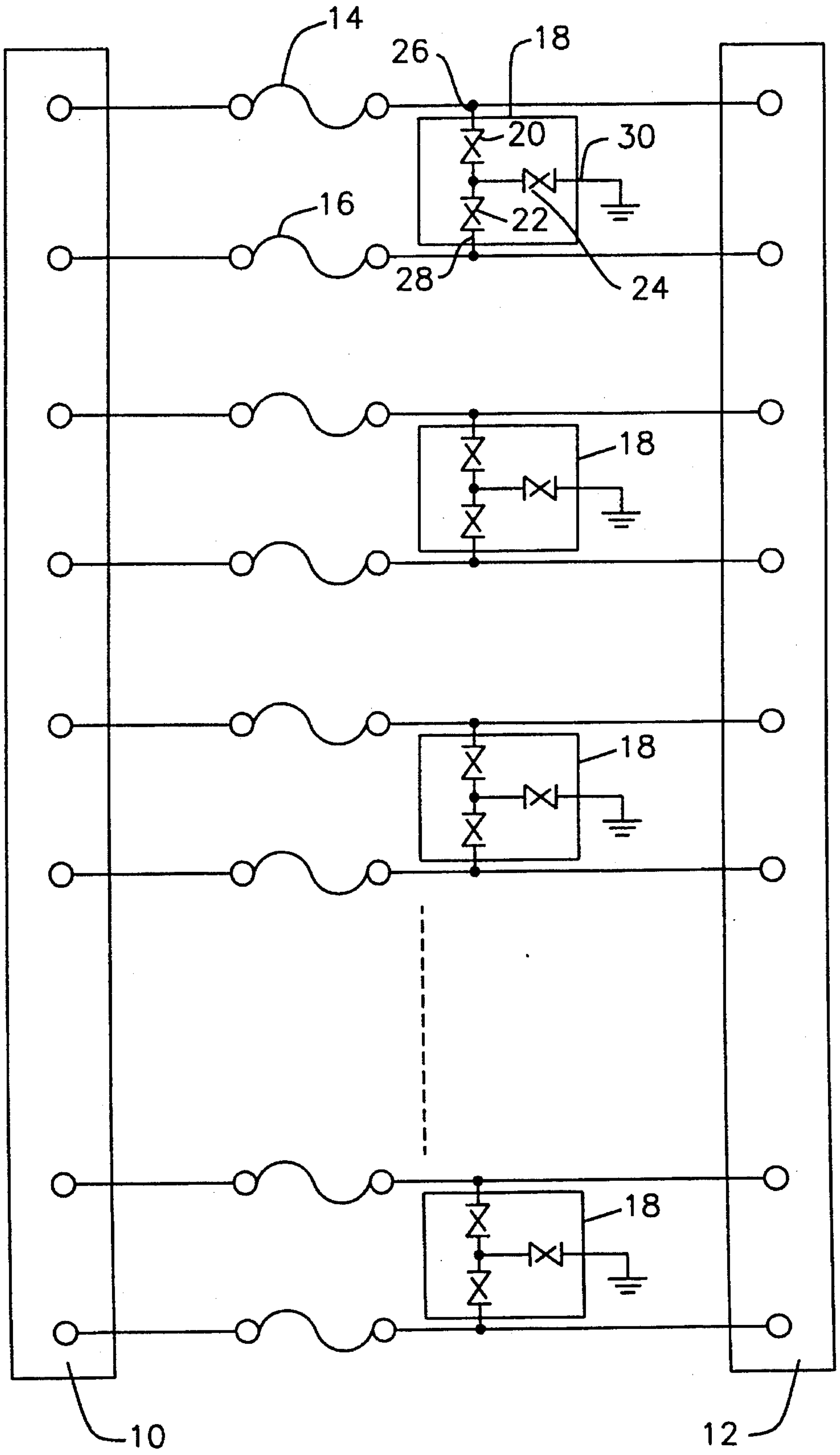
FIG. 1 is a circuit diagram of illustrative circuitry which may be utilized in the assembly according to this invention.

Referring now to the drawings, FIG. 1 illustrates protective circuitry mounted to a printed circuit board contained within a housing of an assembly according to the present invention which is adapted to be interposed between cables containing transmission line-pairs and extending between primary lightning protection and telecommunications equipment. As shown, the circuitry includes a connector 10 matable with a connector terminating a cable coupled to the primary lightning protection and a connector 12 matable with a connector terminating a cable coupled to the telecommunications equipment. Respective line-pairs within each of the cables are interconnected by respective circuitry shown in FIG. 1.

For each set of line-pairs, the circuitry includes a pair of resettable fuse elements 14, 16, each interposed serially in a respective line connecting the sets of line-pairs. Illustratively, the fuse elements 14, 16 are of the type TR-600-150 sold by Raychem Corp. Such a fuse element opens the electrical circuit therethrough when heated due to excessive current, and thereafter resets when it cools down in the absence of current. The protective circuitry further includes a multi-terminal protective network 18 for providing transient voltage surge protection for its set of transmission line-pairs. The protective network 18 includes three SIDACtor elements 20, 22 and 24 connected in a "Y" configuration between a first terminal 26 of the network 18, a second terminal 28 of the network 18 and a third terminal 30 of the network 18. The terminal 30 is connected to ground. The network 18 is illustratively of the type manufactured by Teccor Electronics, Inc. of Irving, Tex. and is fully described in U.S. Pat. No. 4,905,119. Thus, the protective network 18 includes a first bidirectional voltage sensitive switch 20 having first and second leads, a second bidirectional voltage sensitive switch 22 having third and fourth leads, a third bidirectional voltage sensitive switch 24 having fifth and sixth leads, means for connecting the first lead of the switch 20 to the terminal 26, means for connecting together the second lead of the first switch 20, the third lead of the second switch 22 and the fifth lead of the third switch 24, means for connecting the fourth lead of the second switch switch 22 to the terminal 28 and means for connecting the sixth lead of the third switch 24 to the terminal 30. Typically, each of the multi-connector cables carries twenty-five line-pairs, so there are twenty-five sets of the aforedescribed circuitry in the protective assembly.

Figure 2:
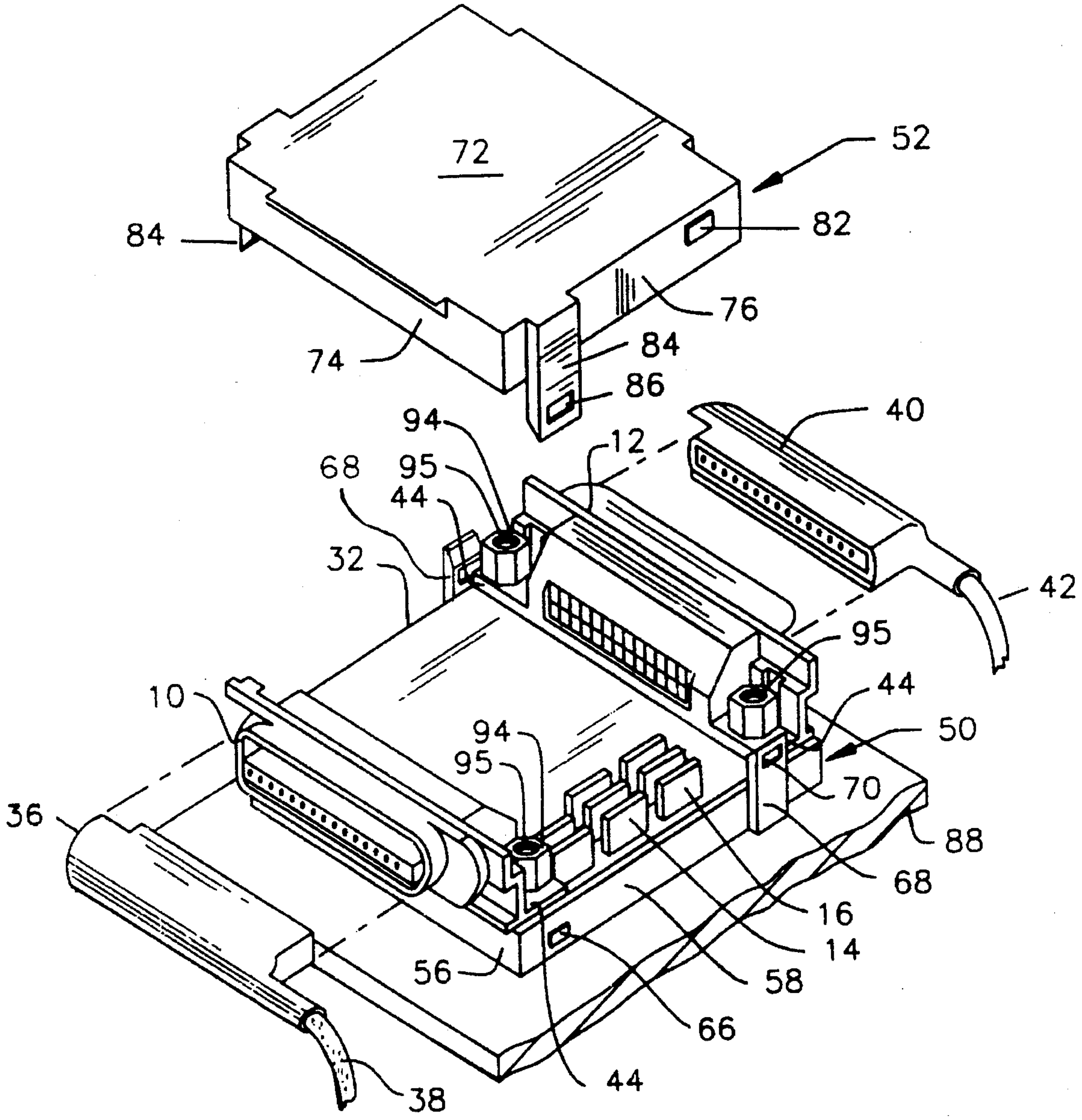
FIG. 2 is a perspective view of the assembly according to this invention mounted on a chassis with the assembly cover exploded away.
Figure 3:
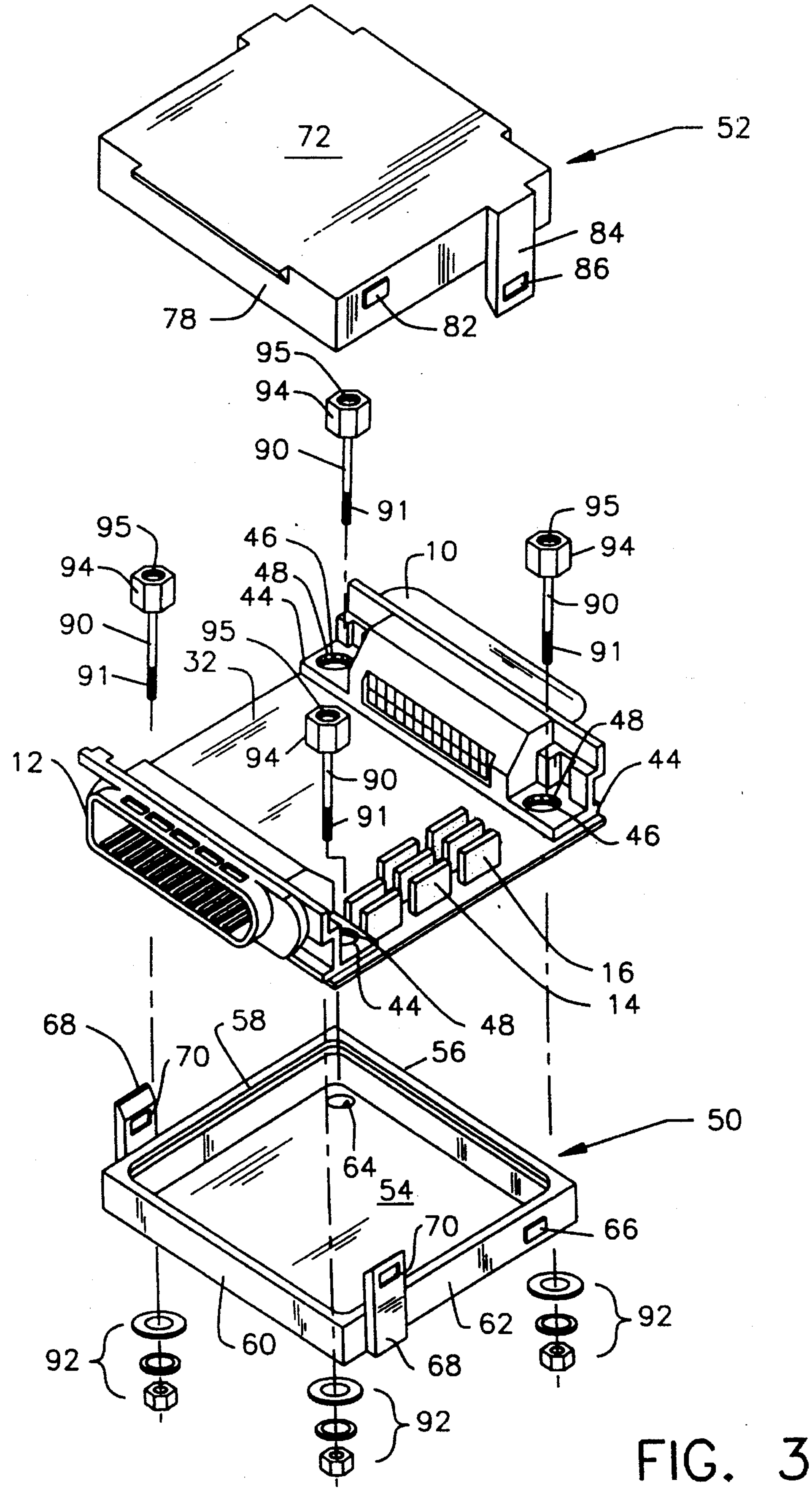
FIG. 3 is an exploded perspective view of the assembly according to this invention taken from a vantage point opposite to that of FIG. 2.

As shown in FIGS. 2 and 3, the circuitry of FIG. 1 is mounted on a printed circuit board 32, with the SIDACtor elements 20, 22, 24 (not shown in FIGS. 2 and 3) mounted beneath the fuse elements 14, 16. As is conventional, the printed circuit board 32 is a multi-layer board having a ground plane. Thus, the terminal 30 of the protective network 18 is connected to that ground layer. Suitable traces connect a first end of the fuse elements 14, 16 to contacts in the connector 10 and suitable traces connect the second ends of the fuse elements 14, 16 to appropriate contacts in the connector 12. Further, suitable traces make the connections between the SIDACtor elements 20, 22, 24 and connect the SIDACtor elements 20, 22 to the fuse elements 14, 16, respectively. At each of the four corners of the circuit board 32 there is a mounting hole (not shown), at least one of which is lined with conductive material (e.g., solder) which is connected to the ground plane.

The connectors 10, 12 are mounted to the circuit board 32, in a conventional manner, and have their contacts connected to the circuitry on the board 32 as shown in FIG. 1. The connector 10 is matable with the connector 36 which terminates the cable 38. The cable 38 has its other end connected to the primary lightning protection for the transmission line-pairs entering a building. The connector 12 is matable with the connector 40 terminating the cable 42. The cable 42 has its other end connected to telecommunications equipment within the building and can be substantially thinner than the cable 38, since there is another level of protection for the line-pairs contained in the cable 42.

Each of the connectors 10, 12 is formed at its ends with a flat flange 44 having a mounting hole 46 therethrough. The mounting holes 46 are in registration with the mounting holes of the printed circuit board 32 when the connectors 10, 12 are mounted to the printed circuit board 32. A rivet 48 passes through each set of mounting holes and makes contact with the conductive material lining the mounting hole of the printed circuit board 32. The head of the rivet 48 surrounds the mounting hole 46 and overlies the flat flange 44.

The protective network assembly is contained within an insulative housing. As shown, the housing has a bottom part 50 and a cover 52. The bottom part 50 has a floor 54 and four upstanding walls 56, 58, 60, 62, so dimensioned that the printed circuit board 32 fits closely therein with the mating faces of the connectors 10, 12 extending over the walls 56, 60, respectively. The floor 54 has mounting holes 64 in its four corners which are in registration with the mounting holes 34 of the printed circuit board 32 and the mounting holes 46 of the connectors 10, 12. The walls 58, 62 are formed with projections 66 and upwardly extending resilient latch fingers 68. The distal ends of the latch fingers 68 have apertures 70 therein.

The housing cover 52 has a roof 72 and four downwardly depending side walls 74, 76, 78, 80, and is sized and shaped so that it covers the circuit elements on the printed circuit board 32 but leaves the connectors 10, 12 exposed. The side walls 76, 80 are each formed with a projection 82 and a downwardly depending resilient latch finger 84. Each of the latch fingers 84 has an aperture 86 at its distal end. The size, configuration, and placement of the projections 66, 82, the latch fingers 68, 84 and the apertures 70, 86 are such that the bottom part 50 and the cover 52 can be snapped together, with the projections 66 entering the apertures 86 and the projections 82 entering the apertures 70.

To mount the aforedescribed assembly to the grounded chassis 88, four conductive female screw locks 90 are provided, along with appropriate sets of washers and nuts 92. Each of the female screw locks 90 has a head 94 which engages the head of a respective rivet 48 when the body of that female screw lock 90 is passed through the mounting hole of the connector, printed circuit board and housing bottom part. Each female screw lock 90 has a threaded hole 95 on the head 94 and screw threads 91. Appropriately registered mounting holes are provided in the chassis 88 and then the entire assembly is secured to the chassis 88 by placing the distal threaded ends of the female screw lock 90 through those chassis mounting holes and securing the female screw lock 90 by means of the washers and nuts 92. In addition to securing the assembly to the chassis 88, this completes the grounding path from the ground plane of the circuit board 32 to the chassis 88.

Figure 4:
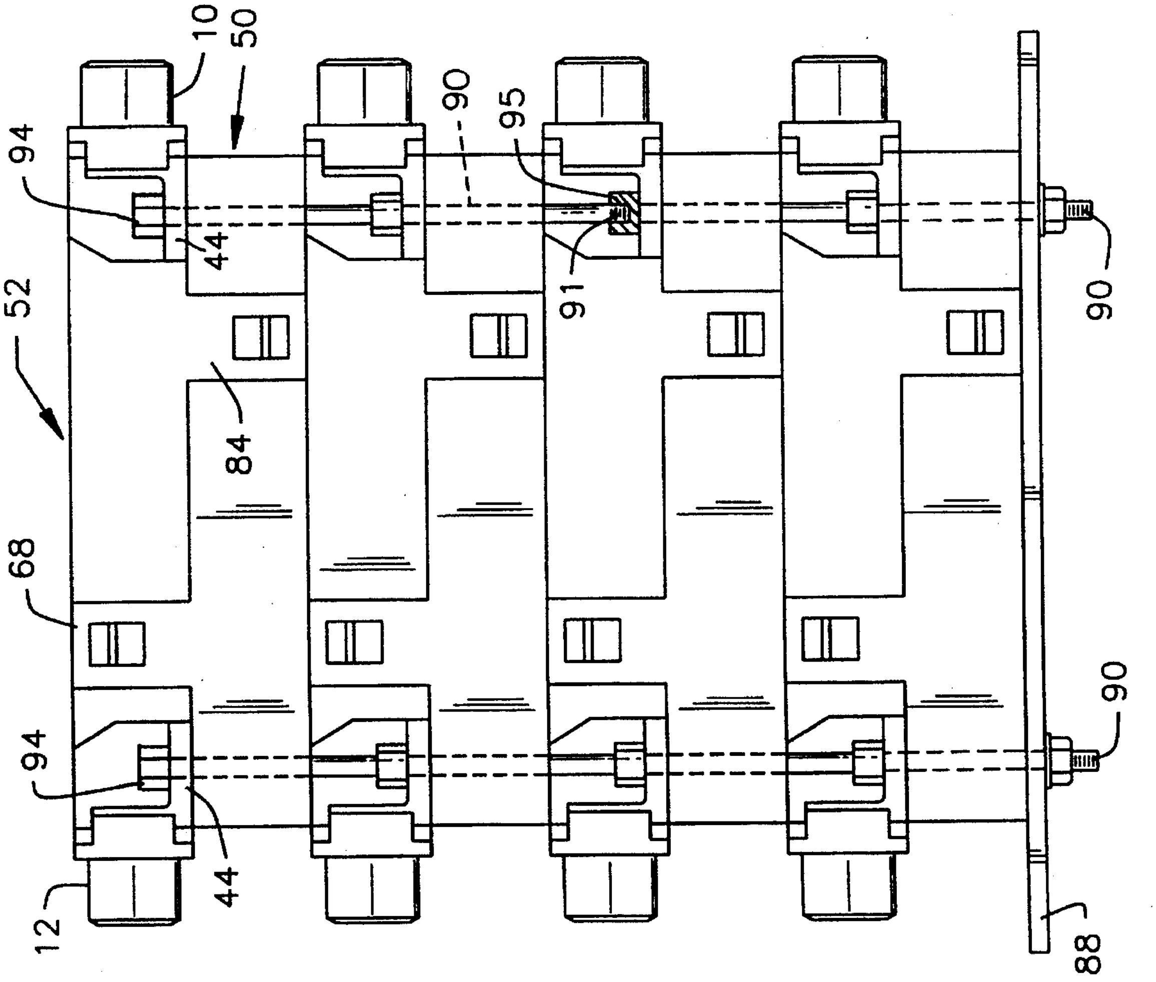
FIG. 4 is a side view showing a stacked array of assemblies according to this invention.

FIG. 4 illustrates how a plurality (illustratively four) of adaptor assemblies can be stacked and secured to the chassis 88 by means of the threads 91 of one female screw lock 90 engaging the threaded hole 95 on the head 94 of another female screw lock 90, thereby securing one assembly to the assembly immediately therebelow.

Accordingly, there has been disclosed an assembly for providing transient voltage surge protection for a plurality of transmission line-pairs carried by a multi-conductor cable. While an illustrative embodiment of the present invention has been disclosed herein, it is understood that various modifications and adaptations to the disclosed embodiment will be apparent to those of ordinary skill in the art and it is intended that this invention be limited only the scope of the appended claims.

What is claimed is:

1. An assembly adapted to be mounted on a grounded chassis and be connected between first and second multi-conductor cables carrying a plurality of transmission line-pairs and terminated respectively by first and second cable connectors, the assembly providing transient voltage surge protection to said plurality of line-pairs, wherein the transient voltage surge protection for each of the line-pairs is provided by a three-terminal protective network having its first and second terminals adapted to be coupled to respective wires of said each line-pair and its third terminal adapted to be connected to ground, wherein the assembly comprises:

a circuit board having a ground plane;

third and fourth cable connectors mounted to said circuit board in spaced relationship, said third cable connector being matable with said first cable connector and said fourth cable connector being matable with said second cable connector;

means for mounting said protective network to said circuit board;

means for coupling said first and second terminals of said protective network to said third and fourth cable connectors so that when said first cable connector is mated with said third cable connector and said second cable connector is mated with said fourth cable connector, said protective network is coupled to each of said line-pairs;

means for connecting the third terminal of said protective network to said circuit board ground plane; and mounting means for connecting said circuit board ground plane to said chassis.

2. The assembly according to claim 1 wherein there is a respective protective network associated with each of said line-pairs.

3. The assembly according to claim 1 further comprising:

a plurality of resettable fuse elements, each of said fuse elements corresponding to a respective conductor of said first cable and a respective conductor of said second cable;

means for mounting said fuse elements to said circuit board; and means for connecting said fuse elements to said third and fourth cable connectors so that each of said fuse elements is in series between respective conductors of said first and second cables connected to said assembly.

4. The assembly according to claim 1 further comprising:

an insulative housing adapted to contain said circuit board and expose said third and fourth cable connectors.

5. The assembly according to claim 4 wherein:

said circuit board is formed with at least one mounting hole;

said housing is formed with at least one mounting hole in registration with said at least one mounting hole of said circuit board; and said chassis is formed with at least one mounting hole;

the assembly further comprising:

at least one conductive mounting member extending through said at least one mounting hole of said circuit board, said housing and said chassis;

means for electrically coupling said circuit board ground plane to said at least one mounting member; and means for electrically coupling said chassis to said at least one mounting member.

6. The assembly according to claim 5 wherein said circuit board ground plane coupling means includes conductive material in electrical contact with said ground plane, said conductive material lining said at least one mounting hole of said circuit board.

7. The assembly according to claim 6 wherein said conductive mounting member includes a conductive bolt having a head at one end and external threads at the other end, said bolt being in electrical contact with said conductive material when said bolt extends through said circuit board mounting hole.

8. First and second assemblies each according to claim 5 and further comprising complimentary means for mechanically mounting the first assembly to the second assembly.

9. The assembly according to claim 8 wherein said means for mechanically mounting the first assembly to the second assembly provides electrical continuity between respective said ground planes of the first and second assemblies.

10. A plurality of adjacent assemblies, each assembly according to claim 7 wherein said external threads of one of the plurality of assemblies coupled to said head of the adjacent one of the plurality of assemblies.

* * * * *